2,809,980

FUNGICIDALLY ACTIVE S-ALKYLISOTHIOUREA SALTS OF REINECKE ACID

Johannes Thomas Hackmann, Amsterdam, Netherlands, assignor to Shell Development Company, New York, N. Y., a corporation of Delaware No Drawing. Application August 12, 1954,
Serial No. 449,490

Claims priority, application Austria August 21, 1953

12 Claims. (Cl. 260—438)

This invention relates to a novel class of salts of S-hydrocarbyl substituted isothioureas, to fungicidal compositions containing these compounds and to a method for controlling fungi on living plants. This invention comprises a new class of chemical compounds which have been found to possess substantial fungicidal activity, yet which are suitable for use on living plant materials and to a method for combatting fungi on such plant materials through the use of compositions containing these new compounds. The new class of fungicides are stable and resistant to weathering and at the concentration levels necessary to effectively destroy fungi are substantially non-toxic to the plant material itself.

The new fungicidally active compounds may be generically described as the salts of S-hydrocarbyl substituted isothioureas with Reinecke acid (tetrathiocyanodiammonochromic acid). These compounds may be further described as the salts of compounds represented by the formula

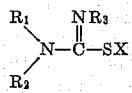

wherein $R_1$, $R_2$ and $R_3$ each represent the hydrogen atom or a hydrocarbyl group and X represents a hydrocarbyl group, with tetrathiocyanodiammonochromic acid.

It is preferred that the group represented by X be an alkyl group, of either straight-chain or branched-chain configuration, and having not more than about 14 carbon atoms, since it has been found that the fungicidal activity of the desired salts decreases substantially as the number of carbon atoms exceeds 14. Preferably, X contains no more than about 12 carbon atoms. A further preferred class of the compounds comprises those in which at least one of $R_1$, $R_2$ and $R_3$ represents a hydrogen atom and the remaining groups are selected from the class consisting of the hydrogen atom, the alkyl radicals and the carbocyclic radicals. It is even more preferable that these alkyl radicals contain not more than about 10 carbon atoms each, and the carbocyclic radicals contain not more than about 16 carbon atoms each. A particularly desirable group of these compounds are those in which $R_1$, $R_2$, and $R_3$ are selected so that the sum of the carbon atoms contained in these three groups is not more than about 45.

These new compounds may conveniently be prepared by at least two methods. In the first of these methods, the isothiourea derivative is intimately contacted with the acid, preferably in the presence of an inert liquid which is a solvent for all of the components of the reaction mixture, but which, preferably is not a solvent for the product. In the second of these methods, a water soluble salt of the isothiourea, for example, the hydrochloric acid or hydrobromic acid salt thereof, dissolved in water, is intimately contacted with the alkali metal or ammonium salt of the acid effecting a double decomposition. The desired salt product in most cases is substantially insoluble in water and is recovered as a precipitate. The latter of the two methods is preferable.

The double decomposition reaction is effected in substantially a stoichiometric manner by simply mixing theoretical amounts of the two reactants in a water medium, stirring, while heating gently, and recovering the desired salt as a precipitate. The by-product salt, an alkali metal or ammonium halide, is generally water soluble. A moderate excess of either reactant may be used, although such is generally unnecessary, and leads to waste of the excess of reagent. The reaction will proceed at any temperature above about 10° C., but it is generally most convenient to effect the reaction at a temperature within the range of from about 25° C. to about 60° C., since the alkali metal and ammonium salts of Reinecke acid tend to be somewhat unstable at higher temperatures. Sufficient water should be used to dissolve all of the reactants, and a moderate excess is desirable, an excess of from about 50% to about 200% being preferred. As the Reinecke salt, it is preferred to use the ammonium salt, the alkali metal salts being less desirable because of their somewhat lesser solubility in water.

Examples of the S-hydrocarbyl isothiourea reactant include S-n-butylisothiourea, S-n-hexylisothiourea, S-n-octylisothiourea, S-2-ethylhexylisothiourea, S-nonylisothiourea, S-undecylisothiourea, S-tetradecylisothiourea, S-phenylethylisothiourea, S-phenylbutylisothiourea, N,N-dipropyl - N' - phenyl - S - butylisothiourea; N-methyl-N-phenyl-N'-n-hexyl-S-ethylisothiourea; N,N,N'-trimethyl-S-n-hexylisothiourea; N-phenyl-N,N'-dimethyl-S-ethylisothiourea; N,N,N' - trimethyl-S-n-decylisothiourea; N,N'-diisopropyl-N-methyl-S-amylisothiourea; N,N-diisobutyl-N'-phenyl-S-isopropylisothiourea; N,N,N'-trimethyl-S-(2-ethylhexyl)isothiourea; N,N - dimethyl-N'-cyclohexyl-S-ethylisothiourea; N,N,N' - triethyl - S - phenylisothiourea; N,N - dimethyl - N' - phenyl - S - (3,5,5 - trimethylhexyl) isothiourea; N,N-dimethyl-S-n-octylisothiourea and N,N'-diphenyl-S-ethylisothiourea. A particularly desirable member of this group of compounds is S-alphanylisothiourea. By the term "alphanyl" is meant a mixture of long chain ($C_7$–$C_9$) alkyl radicals derived from a mixture of $C_7$–$C_9$ alcohols commercially available under the trade name "Alphanol" and which has the approximate composition:

| | Percent |
|---|---|
| n-Heptanol (plus 2-methylhexanol-1) | 45 |
| n-Octanol (plus 2-methylheptanol-1) | 43 |
| n-Nonanol (plus 2-methyloctanol-1) | 12 |

Typical examples of these new compounds include the Reinecke salts of S-alphanylisothiourea, S-n-octylisothiourea, N,N'-diphenyl-S-ethylisothiourea, as well as of the other S-hydrocarbylisothioureas described above.

The new compounds are primarily useful as fungicides. As such, they need not be employed in a pure condition.

The salts of the present invention can be used alone or in combination with other fungicidal, viricidal, insecticidal or acaricidal materials, the action of which may be either internal or external, with plant nutritives, with plant hormones, and the like. Wetting agents, and, if necessary or desirable, stickers such as the heavy hydrocarbon oils with a minimum viscosity of 10° Engler at 50° C. can be present. Any conventional wetting agent, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions, for example, in water, solvents such as oils, emulsifiers, emulsion stabilizers, and the like can be added. Materials which suppress the phytotoxic action of the fungicides, thereby making it possible to utilize unusually high dosages of the fungicidal material, can also be present. For example, glucose is known to protect tomato plants against damage by certain substances having a phytotoxic effect when in concentrated form, such as urea.

The present salts are preferably applied to plants by means of spraying. Spraying of the plants to be treated is preferably performed with aqueous emulsions or suspensions of the active agents. Aqueous emulsions or suspensions containing from about 0.01 to about 1% by weight, and preferably from about 0.05 to about 0.5% by weight, of the active agent are particularly suitable. The spray liquid is generally applied at a rate of from about 75 to about 150 gallons per acre. If spraying is effected with much smaller quantities of liquid, as in low volume spraying, higher concentrations of the active agents should be employed. If desired, a minor amount, of the order of from about 0.01 to about 0.05% by weight, of a wetting agent can be added to aid in forming a suspension of the salt in the aqueous medium. Any of the conventional wetting agents, such as those mentioned above, can be employed. Particularly suitable wetting agents are the sodium salt of a mixture of secondary heptadecyl sulfates, sold commercially under the name of "Teepol" and polyethylene glycol ethers of alkyl phenols sold under the trade name of "Triton X-100" and "Triton X-155." Preferably, concentrate compositions comprising the active salt of the present invention and a suitable wetting agent are prepared, and the concentrate is then dispersed in water just prior to use.

A further form in which the fungicidal compounds may be applied consists of solutions of the active ingredients in suitable inert liquid or semi-solid diluents in which the active ingredient is present in molecularly dispersed form. The form in which the agents to be employed are applied to the object treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations or the material of the storage vessel. Examples of suitable solvents are high-boiling oils, e. g. oils of vegetable origin such as castor oil, etc., and lower-boiling solvents with a flash point of at least 30° C., such as carbon tetrachloride, ethylene dichloride, ethane tetrachloride, hydrated naphthalene, alkylated naphthalene, solvent naphtha, etc. Mixtures of solvents may, of course, also be used.

The present salts can also be applied to plants in the form of dusts, utilizing as the inert vehicle such materials as tricalcium phosphate, precipitated chalk, bentonite, kaolin, kieselguhr, etc., but cork powder, wood powder and the like may also be used. In these cases it is advisable to add wetting agents.

The active substances in question may also be used in the form of aerosols. For this purpose the active ingredient must be dissolved or dispersed in a solvent boiling below room temperature at atmospheric pressure.

The invention is illustrated by the following examples which are not to be considered as limiting the specification and claims in any manner.

EXAMPLE I

S-n-octylisothiourea Reineckate was prepared as follows: 35.4 g. of the NH4 salt of Reinecke acid were dissolved in 600 cc. of water, after which 26.9 g. of the HBr salt of S-n-octylisothiourea were added in 15 minutes at 40° C. while stirring continually. A red precipitate was produced which was filtered off, rewashed with water and finally dried. The yield amounted to 50 g., viz, 100% of the theoretical.

EXAMPLE II

The Reinecke salts of N,N'-diphenyl-S-ethylisothiourea, S-alphanyl-isothiourea and S-n-octylisothiourea were sprayed in the form of aqueous emulsions in various concentrations on potato and tomato plants affected by *Phytophthora infestans*. For purposes of comparison a number of other plants, also infected with phytophthora, were sprayed with a 0.75% formulation of Koneprox, a commercial preparation containing cuprous oxychloride as the active ingredient.

Test plants were sprayed with an aqueous solution of the active salt until the liquid dropped from the leaves. After the spray liquid dried, usually after about two days, the plants were exposed to contamination with the fungus. Depending on the kind of test plant and of the fungus, contamination was effected either by inoculation of the plant or by placing the plant in contaminated surroundings, for example, in a greenhouse in which plants affected by the fungus were present. Conditions were chosen such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the fungus has succeeded, i. e., relative degree of suppression is expressed as $$\frac{\text{the degree of suppression obtained with the active substance to be used according to the invention}}{\text{the degree of suppression obtained with the standard substance}} \times 100$$

Hereinafter, this quantity, expressed in percent, will be termed the degree of suppression. The degree of suppression was determined at a time at which the untreated plants showed clear symptoms of the disease. As a rule, the lead surfaces were not measured, but estimated with the required accuracy. An experienced person can in this way determine the degree of suppression with an accuracy of about 5%.

In this way a value is obtained which is as accurate as possible for the active substance in question, the absolute degree of suppression depending on the degree of infection. In every case the substances to be used according to the invention were compared with usual concentrations of preparations in commercial use for controlling the corresponding diseases.

The results are summarized in Table I.

*Table I*

| Reineckate of— | Concentration in percent w. | Phytophthora Infestans Disease | | |
|---|---|---|---|---|
| | | on potatoes, relative degree of suppression a | on tomatoes, relative degree of suppression a | degree of infection |
| N,N'-diphenyl-S-ethylisothiourea. | 0.05 | — | 283 | heavy. |
| | 0.1 | 100 | — | medium. |
| S-alphanylisothiourea | 0.05 | — | 344 | heavy. |
| | 0.1 | 123 | — | medium. |
| S-n-octylisothiourea | 0.05 | — | 335 | heavy. |
| | 0.1 | 122 | — | medium. |

—=not investigated.
a Standard of comparison—Koneprox 0.75% by weight.

The results show irrefutably that especially where there is heavy infection the active agent in question can excellently stand comparison with the commercial preparation which is much in use at present.

EXAMPLE III

The activity of the Reinecke acid salt of S-alphanyliso-thiourea against *Phytophthora infestans* on tomatoes and potatoes was compared to the effect of Dithane in a spray concentration of 0.2%. The results are shown in Table II.

(Dithane is the trade name for a commercial fungicide comprising zinc ethylene bisdithiocarbamate as the active ingredient.)

Table II

| Salt of S-Alphanyl-isothiourea with— | Phytophthora Infestans On— | | | |
|---|---|---|---|---|
| | Tomatoes | | Potatoes | |
| | Conc.ᵃ Used | Percent Control/Percent Control with Dithane 0.2% | Conc. Used | Percent Control/Percent Control with Dithane 0.2% |
| Reinecke acid | 0.1 | 1.0 | 0.1 | 1.0 |

ᵃ All products formulated as 10% wettable powder, containing 85% bentonite and 5% sulfite lye.

EXAMPLE IV

The Reinecke acid salt of S-alphanylisothiourea (A) was compared (in the form of a wettable powder) to two commercial fungicides, Dithane and Koneprox (active ingredient—copper oxychloride) both of which were also in the form of wettable powders.

The results are shown in Table III.

Table III

| Fungicide | Phytophthora on Tomatoes (Concentration of Active Material in Percent Comparable with)— | | Altervaria on Tomatoes (Concentration of Active Material in Percent Comparable with)— | |
|---|---|---|---|---|
| | Dithane 0.2–0.24% | Koneprox 0.5% | Dithane 0.2–0.24% | Koneprox 0.5% |
| (A) | 0.1 | 0.1 | 0.1 | 0.1 |

I claim as my invention:

1. As a new compound, the simple S-alkylisothiourea salt of tetrathiocyanodiammonochromic acid.

2. The compound of claim 1 in which the S-alkyl group contains up to about 14 carbon atoms.

3. The compound of claim 1 in which the S-alkyl group contains from 7 to 9 carbon atoms.

4. The simple tetrathiocyanodiammonochromic acid salt of a compound having the structure represented by the formula:

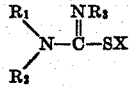

wherein X represents an alkyl group containing up to 14 carbon atoms, and $R_1$, $R_2$ and $R_3$ each represents a member of the class consisting of the hydrogen atom, alkyl radicals containing up to about 10 carbon atoms and carbocyclic radicals containing not more than about 16 carbon atoms.

5. The compound defined in claim 4 in which at least one of $R_1$, $R_2$ and $R_3$ represents a hydrogen atom.

6. The compound defined in claim 4 in which the total number of carbon atoms in the groups represented by $R_1$, $R_2$ and $R_3$ does not exceed about 45.

7. As a new compound, the simple N,N'-diphenyl-S-ethylisothiourea salt of tetrathiocyanodiammonochromic acid.

8. As a new compound, the simple S-n-octylisothiourea salt of tetrathiocyanodiammonochromic acid.

9. A fungicidal composition comprising the simple S-alkylisothiourea salt of tetrathiocyanodiammonochromic acid and an emulsifying agent suitable for dispersing said salt in an aqueous medium.

10. A fungicidal composition comprising the simple S-alkylisothiourea salt of tetrathiocyanodiammonochromic acid and a solvent for said salt as fungicidal adjuvant therefor.

11. A fungicidal composition comprising simple tetrathiocyanodiammonochromic acid salt of a compound having the structure represented by the formula:

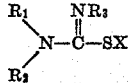

wherein X represents an alkyl group containing up to 14 carbon atoms, and $R_1$, $R_2$ and $R_3$ each represents a member of the class consisting of the hydrogen atom, alkyl radicals containing up to about 10 carbon atoms and carbocyclic radicals containing not more than about 16 carbon atoms, and an emulsifying agent suitable for dispersing said salt in an aqueous medium.

12. A fungicidal composition comprising the simple tetrathiocyanodiammonochromic acid salt of an S-alkylisothiourea in which the S-alkyl group contains from 7 to 9 carbon atoms, and a solvent for said salt as fungicidal adjuvant therefor.

References Cited in the file of this patent

UNITED STATES PATENTS 2,062,911     Kharasch     Dec. 1, 1936

OTHER REFERENCES

Mahr et al.: Zeit. Anal. Chem., 109 (1937), 3.